United States Patent [19]

Okatsuka

[11] 4,297,568
[45] Oct. 27, 1981

[54] COOKING APPARATUS

[75] Inventor: Hisahi Okatsuka, Tokyo, Japan

[73] Assignee: Tokyo Shibaura Denki Kabushiki Kaisha, Kawasaki, Japan

[21] Appl. No.: 37,953

[22] Filed: May 10, 1979

[30] Foreign Application Priority Data

May 16, 1978 [JP] Japan .................................. 53-57937

[51] Int. Cl.³ ...................... H01H 43/08; G06K 7/00; G06K 13/04; G06K 13/06
[52] U.S. Cl. .................................. 235/435; 235/445; 235/479; 235/483; 235/489; 200/46
[58] Field of Search ............... 235/483, 459, 442, 486, 235/479, 439, 435, 443, 444, 445, 446, 489; 200/46

[56] References Cited

U.S. PATENT DOCUMENTS

| | | | |
|---|---|---|---|
| 3,066,863 | 12/1962 | Wilson | 200/46 |
| 3,112,378 | 11/1963 | Holzer | 200/46 |
| 3,255,321 | 6/1966 | Trepanier et al. | 200/46 |

FOREIGN PATENT DOCUMENTS 49-125939 12/1974 Japan .
53-88249 8/1978 Japan .

*Primary Examiner*—Robert M. Kilgore
*Attorney, Agent, or Firm*—Cushman, Darby & Cushman

[57] ABSTRACT

A cooking apparatus may automatically cook according to a cooking program fed from a recording card. The apparatus includes a cooking program feeding mechanism detachably holding the recording card and reading a cooking program from the recording and by moving a detection bar with microswitches along the recording card.

6 Claims, 13 Drawing Figures

COOKING APPARATUS

This invention relates to a cooking apparatus, and more particularly to a cooking apparatus such as a microwave oven, which automatically cooks food according to a cooking program.

A known cooking apparatus, particularly a microwave oven, of this type is provided with a microcomputer and an input keyboard. The input keyboard comprises various function keys and is mounted on the front of the oven. The function keys are selectively operated to respectively apply input signals to feed cooking programs such as cooking time, heat level etc. According to the program thus fed the oven cooks food automatically in a desired manner. With such a microwave oven, however, it is necessary for the cook to manually operate the function keys several times to feed a cooking program. Further, the cook has to operate the function keys every time he wants to cook food in a new manner. To feed a program is rather a cumbersome work. And the cook often erroneously operates the function keys to fail to cook food in desired fashion. Such a knotty program feeding reduces, so to speak, the function of the microwave oven.

It is an object of this invention to provide a cooking apparatus such as a microwave oven, with which it is easy to feed a cooking program and which can repeatedly use a cooking program to cook food in the same manner so that its function is fully utilized.

This invention can be more fully understood from the following detailed description when taken in conjunction with the accompanying drawings, in which.

Now referring to accompanying drawings, it will be described a microwave oven, an embodiment of this invention.

Figure 6A:
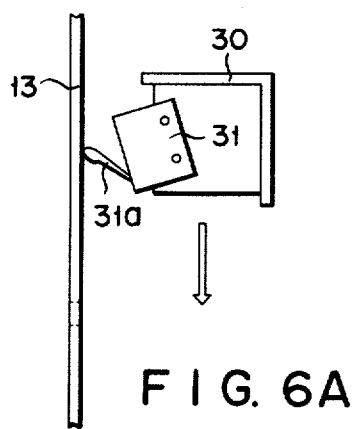
FIGS. 6A and 6B are schematically side views of the mechanism and show how a micro switch is operated as a frame holding it moves.
Figure 6B:
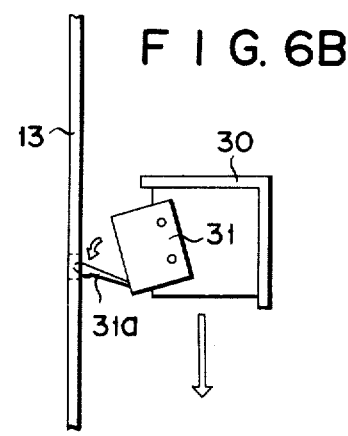
Figure 7:
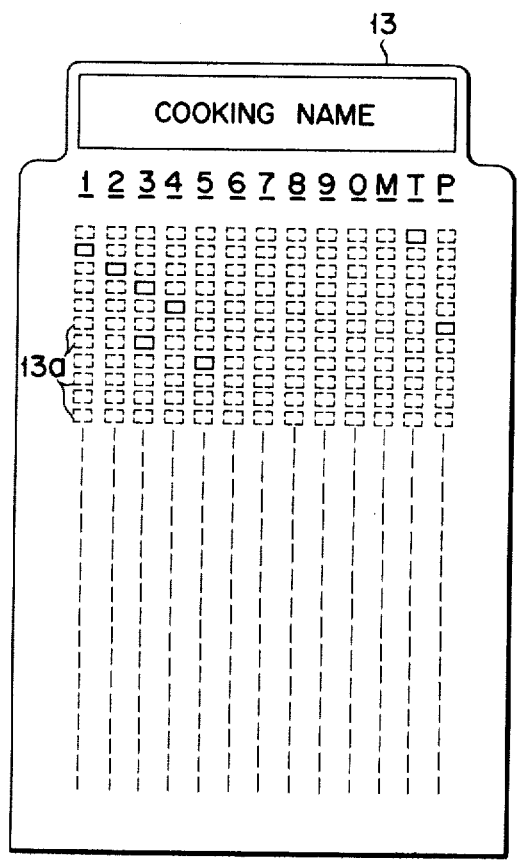
FIG. 7 is a plane view showing a programmed card used in the microwave oven according to this embodiment.

The microwave oven is provided with a cooking program feeding mechanism as illustrated in FIGS. 1 to 6. Numeral 11 indicates a support which is constituted by a vertical plate 11a and a horizontal plate 11b integrally formed with the lower end of the vertical plate 11a. A little above the lower end of the plate 11a a card-receiving plate 12 protrudes from the front face of the plate 11a substantially at right angle. On the support 11 there is held a record medium, e.g. such a programmed card 13 as shown in FIG. 7, with its lower end in contact with the card-receiving plate 12 and its back in contact with the front face of the plate 11a.

The card 13 is made of, for example, plastics or paper having a sufficient rigidity. Columns of marks 13a are respectively defined by perforated lines on the card 13. Marks of column P are to indicate heat output levels, marks of column T are to represent cooking periods and marks of column M are to show the end or start of a cooking step. The marks 13a of the remaining columns 0 to 9 are to indicate various heat output levels and various cooking periods. The marks 13a can be to make openings with, for instance, a pointed pencil, thereby to form a program for a desired cooking. For example, as illustrated in FIG. 7, the top mark of column T, the second mark of column 1, the third mark of column 2, the fourth mark of column 3 and the fifth mark of column 4 are torn so as to define a cooling period of 12 minutes, 34 seconds. Further, the sixth mark of column P, the seventh mark of column 3 and the eighth mark of column 5 are torn so as to define a heat output level of 35. The cooking period and heat output level define a step of cooking, i.e. "heat the food at level 35 for 12 minutes, 34 seconds." Then, though not shown in FIG. 7, the nineth mark of column M is torn to indicate that the cooking step thus defined ends and a new step will start. Smilar steps of cooking are defined by tearing the marks 13a to make openings, whereby a cooking programs, i.e. sequence of cooking steps, is formed. The title of cooking may be written on the top margin of the programmed card 13, and cooking instructions may be jotted on the reverse face of the card 13.

In the corner defined by the vertical plate 11a and the horizontal plate 11b a pair of bearings 14 are secured, spaced at a predetermined distance from each other. These bearings 14 rotatably support a shaft 15. A pair of card-holding members 16a and 16b are provided to loosely sandwich the vertical plate 11a. The card-holding members 16a and 16b are of substantially the same length as the plate 11a. Each of them is made of a plate which is bent at right angle so that a part of it extends parallel to the plate 11a over the front face thereof. In the space between said parts of the card-holding members 16a and 16b and the front face of the plate 11a the lateral edges of the card 13 are held. The members 16a and 16b have holes at their lower end portions. And through these holes the shaft 15 extends beyond the members 16a and 16b. About the shaft 15 the members 16a and 16b can rock in the direction of arrow shown in FIG. 2.

The support 11, the card-receiving plate 12, the bearings 14, the shaft 15 and the card-holding members 16a and 16b constitute a card-holding mechanism. The card 13 may be easily fed into the mechanism and easily pulled out of the mechanism.

To the lower end of the card-holding member 16a a motor table 17 is secured. The table 17 extends rearward of the card-holding mechanism. On the motor table 17 a motor 18 is fixed to have its shaft extending beyond the card-holding member 16a. A timing pulley 19 is coaxially attached to the shaft of the motor 18. Another timing pulley 20 is coaxially attached to the end of the shaft 15 which is protruding from the card-holding member 16a. A timing belt 21 is stretched between the pulleys 19 and 20. The pulley 20 is twice as thick as the pulley 19, and another belt may be supported on it. To the upper end of the card-holding member 16a a timing pulley 22 is rotatably attached. Between pulley 22 and the pulley 20 a timing belt 23 is stretched. The motor 18 can therefore drive the pulley 20 via the pulley 19 and the belt 21, and the pulley 20 makes the timing belt 23 run.

To the other end of the shaft 15 which is protruding from the card-holding member 16b a timing pulley 24 is coaxially attached. To the upper end of the member 16b a timing pulley 25 is rotatably attached. A timing belt 26 is streatched between these pulleys 24 and 25 and disposed symmetrical to the timing belt 23. Thus, in synchronize with the timing belt 23 the belt 26 can run up and down as the motor 18 drives the pulley 20 secured to the shaft 15.

Figure 1:
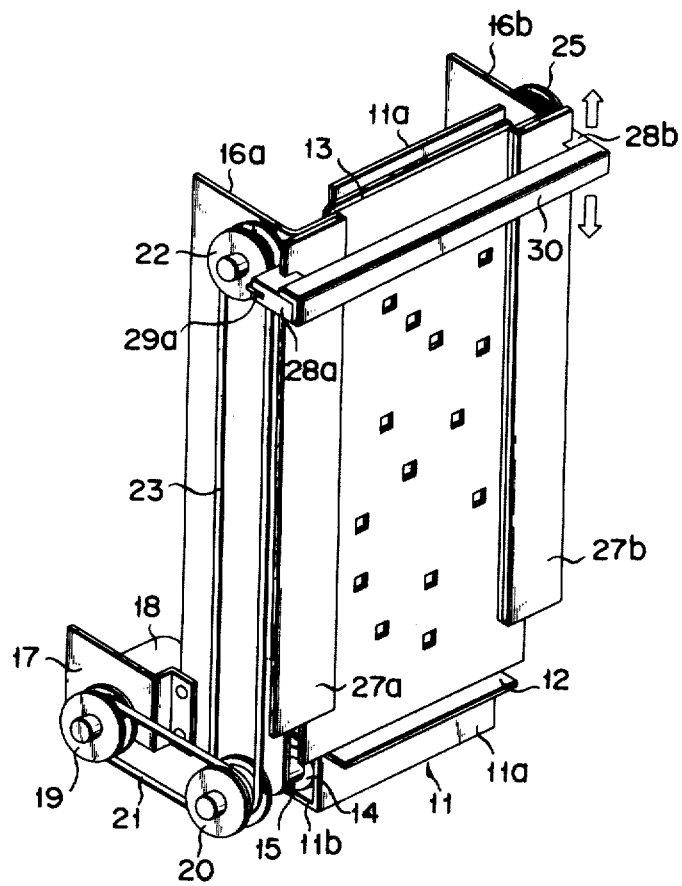
FIGS. 1 and 2 are perspective views of a mechanism for feeding a cooking program in different state, which is used in cooking apparatus according to one embodiment of this invention.
Figure 2:
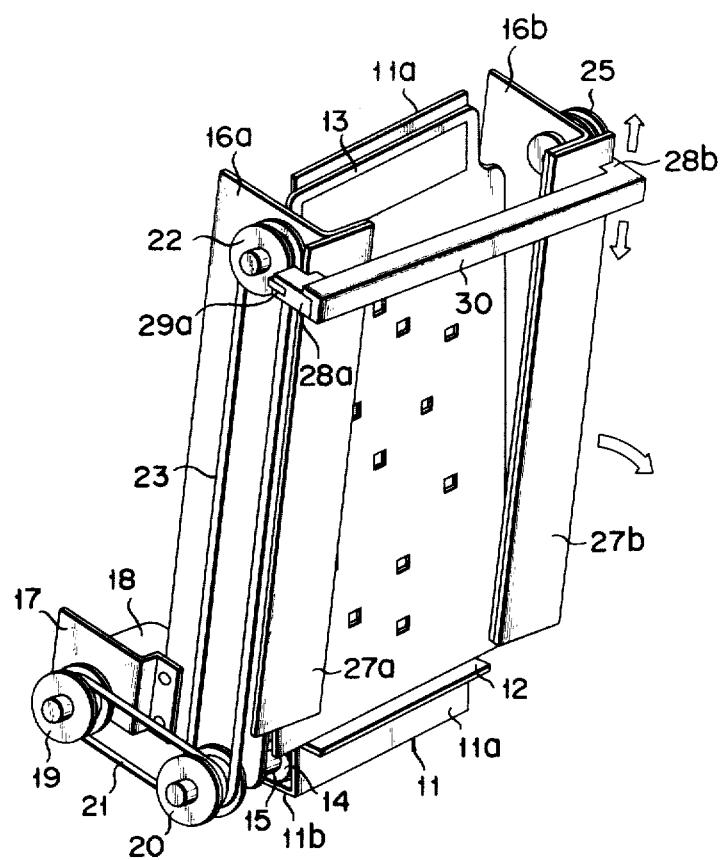
Figure 3:
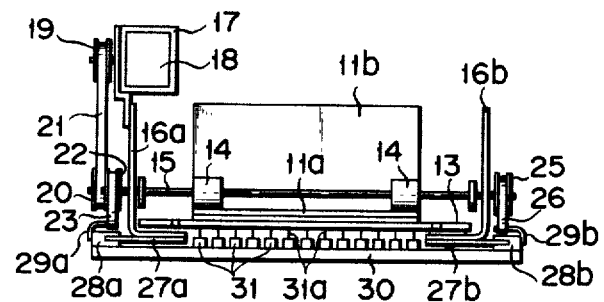
FIG. 3 is a plan view of the mechanism.
Figure 4:
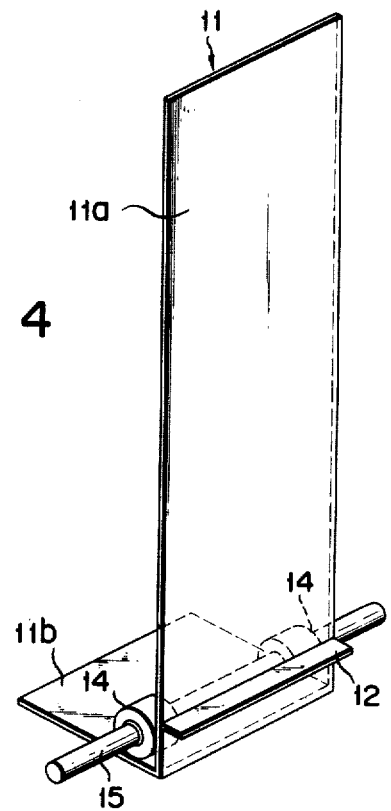
FIG. 4 is a perspective view of a support of the mechanism.
Figure 5:
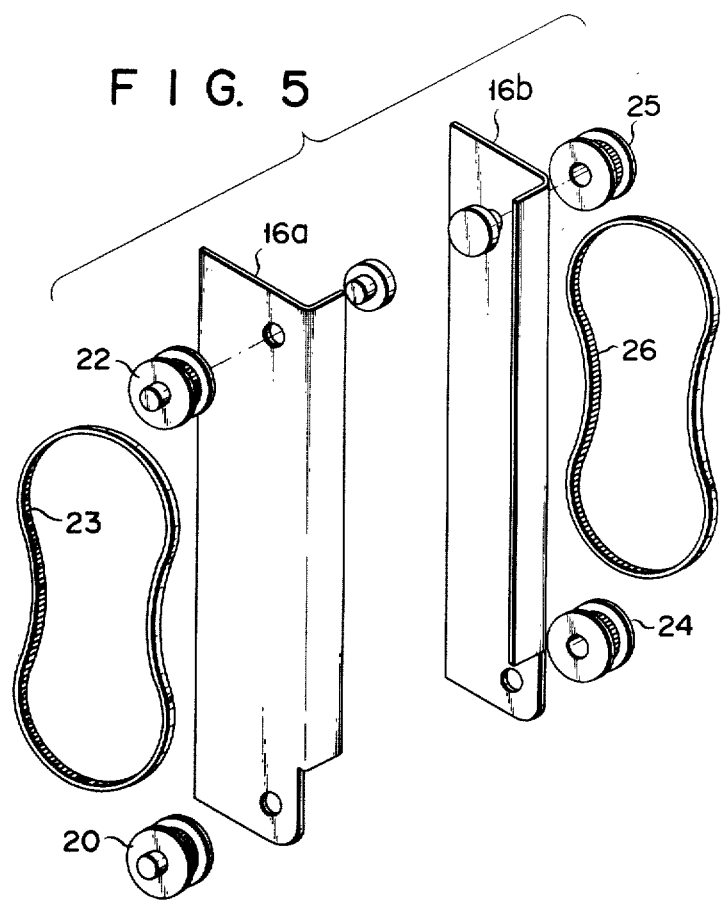
FIG. 5 is an exploded perspective view of a stationary frame and the members to be attached to the frame.

A pair of rectangular plates 27a and 27b are laid on the bent parts of the card-holding members 16a and 16b, respectively. They laterally extend a little beyond the card-holding members 16a and 16b and function as vertical guides. A pair of sliders 28a and 28b each having a groove are so provided that they are slidable up and down on and along the plates 27a and 27b, respectively. The sliders 28a and 28b are secured to the timing belts 23 and 26, respectively by means of pins 29a and 29b. The sliders 28a and 28b are therefore moved up and down as the belts 23 and 26 run up and down. They are coupled respectively to the opposite ends of a switch-holding bar 30 which extends horizontally over the front face of the vertical plate 11a. The bar 30 therefore moves up and down at a constant speed as the slide 28a and 28b slides up and down on the plates 27a and 27b, respectively. On that side of the bar 30 which faces the vertical plate 11a, a predetermined number of microswitches 31 are equidistantly arranged to meet marks 13a forming a row on the programmed card 13, as illustrated in FIG. 3. The microswitches 31 have each an actuator 13a, which is put in frictional contact with the programmed card 13.

As the switch-holding bar 30 moves downwards gradually, the actuators 31a protrude into the openings, if any, of the card 13. When the actuator 31a of each microswitch 31 protrudes into the opening as shown in FIG. 6B, the switch 31 is turned on. In this way, the microswitches 31 are selectively turned on according to the openings of the card 13, thus feeding a cooking program to a microcomputer (not shown) of the microwave oven. According to the cooking program thus fed, the microwave oven cooks food automatically.

Figure 8:
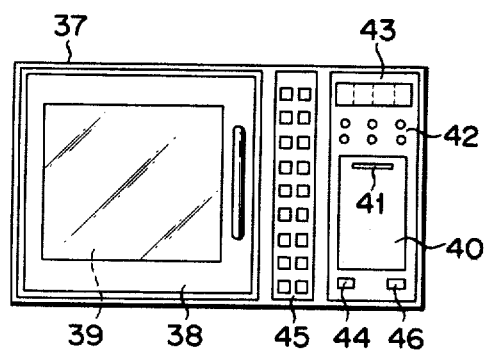
FIG. 8 is a schematic front view of the microwave oven.

As illustrated in FIG. 8, the microwave oven with the above-described cooking program feeding mechanism comprises a housing 37, a door 38 having a window through which to observe how food is cooked and a cooking chamber 39 which is open when the door 38 is opened. In the chamber 39 food is subjected to the known high frequency heating.

Figure 9:
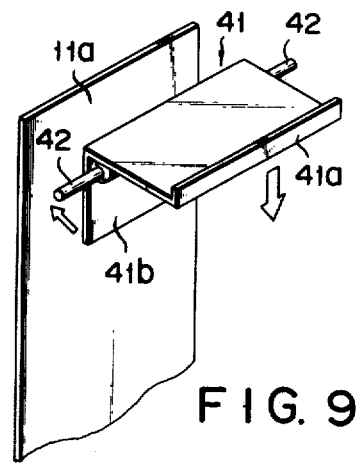
FIG. 9 is an enlarged perspective view of a reset lever and a supporting plate.

In FIG. 8, reference numeral 40 indicates a transparent cover made of plastics. The cover 40 has its lateral edges secured to the card-holding members 16a and 16b. Through the cover 40 the support 11, the card-holding members 16a and 16b and the switch-holding bar 30 are seen. A reset lever 41 penetrates the cover 40. The lever 41 is pulled down to rock the card-holding members 16a and 16b and the cover 40 in the direction of arrow shown in FIG. 2 so that the upper ends of the members 16a and 16b and the upper edge of the cover 40 come out from the front face of the housing 37. As shown in FIG. 9, the reset lever 41 is constituted by a plate having an L-shaped cross section and consists of two portions 41a and 41b. The lever 41 is rotatably attached to the cover 40 by means of a shaft 42. The portion 41a is positioned outside, and the portion 41b is located inside with respect to the cover 40. When the portion 41a is pulled down in the direction of arrow shown in FIG. 9, the portion 41b pushes the vertical plate 11a or the programmed card 13. Then, a reactional force exerts on the card-holding members 16a and 16b, and these members 16a and 16b come out together with the cover 40 from the front face of the housing 37. While the reset lever 41 is pulled down, the programmed card 13 may be taken out from, or inserted into, the space between the vertical plate 11a and the card-holding members 16a and 16b, without any frictional contact between the card 13 and the microswitches 31.

Above the cover 40 on the front face of the housing 37, mode lamps 42 are arranged to show in which mode the food in the cooking chamber 39 is being cooked. Above the mode lamps 42 a digital display device 43 is provided to display a cooking program. The display device 42 displays the time instead of a cooking program so long as a clock button 44 arranged below the cover 40 is pushed. On the left side of the cover 40, a number of key switches 45 are provided. The switches 45 are selectively operated to set a cooking period or a heat output level. The cooking period or heat output level thus set is displayed by the display device 43 if the clock button 44 is in OFF-position. Thus, a cooking program may be fed by operating the switches 45 just as in the known microwave oven with a microcomputer, not using a programmed card 13. It is desired that the switches 45 usually be protected with a cover and that they could not be operated unless the cover is taken off. Below the cover 40, a cooking start switch 46 is provided.

As clearly understood from the above, the microwave oven shown in FIG. 8 is provided with a known key switch board to feed a cooking program.

Figure 10:
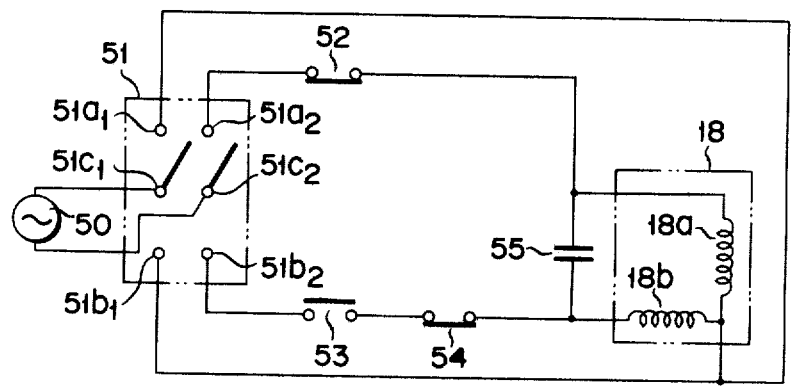
FIG. 10 shows a driving circuit for the mechanism.

FIG. 10 shows an electric circuit for driving the above-described cooking program feeding mechanism. An AC power source 50 has its terminals connected to movable contacts $51c_1$ and $51c_2$ of a changeover switch 51. The switch 51 has two pairs of stationary contacts, one pair consisting of contacts $51a_1$ and $51a_2$ and the other consisting of contacts $51b_1$ and $51b_2$. The movable contacts $51c_1$ and $51c_2$ are put into contact with the stationary contacts $51a_1$ and $51a_2$, respectively to move the switch-holding bar 30 downward thereby to feed a cooking program and with the stationary contacts $51b_1$ and $51b_2$ to move the bar 30 upward. The changeover switch 51 is attached to, for instance, the housing 37 and may be designed to operate in interlock with the reset lever 41.

The stationary contact $51a_2$ is connected to one end of the primary winding 18a of the motor 18 via a microswitch 52 which is normally closed. The stationary contact $51a_1$ is coupled to the other end of the primary winding 18a and one end of the auxiliary winding 18b of the motor 18. The microswitch 52 is provided, for example, on the lower end portion of the card-holding member 16a. It is closed when the switch-holding bar 30 is at its lowest position. The stationary contact $51b_2$ is connected to the other end of the auxiliary winding 18b via a microswitch 53 which is normally opened and a microswitch 54 which is normally closed. The stationary contact $51b_1$ is coupled to the point where the primary winding 18a and the auxiliary winding 18b are connected to each other. A capacitor 55 is connected between said one end of the primary winding 18a and other end of the auxiliary winding 18b. The microswitch 53 is provided, for example, on the lower end portion of the card-holding member 16a. It comes into contact with the housing 37 and is closed when the upper ends of the members 16a and 16b are pulled out from the front face of the housing 37. The microswitch 54 is provided, for example, on the upper end portion of the card-holding member 16a and is opened when the member 16a is at the highest position.

Now it will be described how the microwave oven of the above-described construction does operate.

Desired marks 13a of a card 13 are torn to define a cooking program. As shown in FIG. 7, only one of the marks 13a of each row is torn up to form an opening. The reset lever 41 is then pulled down to rock the card-holding members 16a and 16b with respect to the vertical plate 11a of the support 11. Then, the card 13 is placed on the vertical plate 11a and the card-receiving plate 12. The card 13 pushes down the part 41b of the reset lever 41, and the lever 41 returns to the initial position together with the cover 40. As a result, the card-holding members 16a and 16b hold the card 13 firmly on the vertical plate 11a. At this time the switch-holding bar 30 is at its highest position. The microswitch 52 is therefore kept closed. When the changeover switch 51 is so operated as to make its movable contacts 51c$_1$ and 51c$_2$ come into contact with its stationary contacts 51a$_1$ and 51a$_2$, respectively, the motor 18 is driven. This operation of the switch 51 connects the series circuit constituted by the auxiliary winding 18b and the capacitor 55 in parallel to the primary winding 18a, whereby a leading-exciting current flows to drive the motor 18 shown in FIG. 1 in the clockwise direction. Consequently, the switch-holding bar 30 is moved downwardly at a constant speed through the timing belts 23 and 26 and sliders 28a and 28b. As the bar 30 moves down, the microswitches 31 arrranged on the bar 30 read out the program recorded on the card 13. The program is then fed into the microcomputer (not shown). When the switch-holding bar 30 reaches the lowest position, the microswitch 52 is opened to stop the motor 18. Since the cooking program has been read out from the card 13, it is now possible to cook food according to the cooking program.

When a desired cooking is completed, the part 41a of the reset lever 41 is pulled down to rock the card-holding members 16a and 16b. With the members 16a and 16b moved away from the vertical plate 11a, it is possible to pull out the card 13 from the cooking program feeding mechanism. When the members 16a and 16b are rocked, the microswitch 53 is closed. The microswitch 54 remains closed since the switch-holding bar 30 is not at the highest position. Then, the changeover switch 51 is so operated as to make its movable contacts 51c$_1$ and 51c$_2$ come into contact with its stationary contacts 51b$_1$ and 51b$_2$, respectively. In this case, the auxiliary winding 18b is connected in parallel to the series circuit constituted by the capacitor 55 and the primary winding 18a. Thus, a leading-exciting current flows to drive the motor 18 shown in FIG. 1 counterclockwise. As a result, the timing belts 23 and 26 run in counterclockwise direction, too. The switch-holding bar 30 is therefore moved upward at a constant speed. At this time the card-holding members 16a and 16b spaced away from the card 13, and the microswitches 31 arranged on the bar 30 would not scratch the card 13 as the bar 30 moves up. When the bar 30 reaches its highest position, the microswitch 54 is opened to stop the motor 18.

In the above-mentioned embodiment the marks 13a of the card 13 are torn up to form openings, and the microswitches 31 detect the openings thereby to read a cooking program. Instead, any other detection means may be used if it can read a cooking program as the bar 30 moves down or up. For example, the marks 13a may be projections. Further, light-detecting elements may be used to detect light coming from a light source through perforations made in a card or reflected from reflector dots formed on a card.

Figure 11:
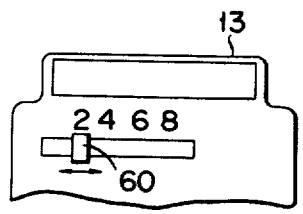
FIG. 11 is a plane view showing the part of card used in the microwave oven according to this embodiment.

In the above-mentioned embodiment the cooking program recorded on a card 13 instructs the microwave oven to cook food for one person. If marks are added to set a cooking period according to the number of persons, the food for two more persons can be cooked at a time. For instance, as illustrated in FIG. 11, a slidable projection 60 may be provided on the upper portion of a card 13, and marks indicating various numbers of persons are printed. Thus, when the projection 60 is slided to a "four persons" mark, for example, the cooking period defined by perforations made in the card 13 is lengthened four times.

Figure 12:
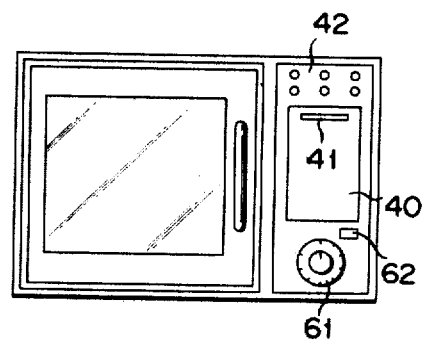
FIG. 12 is a front view of another microwave oven according to this invention.

FIG. 12 shows another embodiment of the microwave oven according to this invention. This microwave oven differs from the oven shown in FIG. 8 in the following respects. First, a timer dial 61 is provided instead. Secondly, neither a key switch board nor a clock button are provided. Thirdly, a digital display device is not provided. As a whole, the oven is simple in comparison with the oven shown in FIG. 8.

The cooking apparatus according to this invention is not limited to a microwave oven. The invention can be applied to an electric oven using an electric heater.

What is claimed is:

1. A cooking apparatus for automatically cooking according to a program fed from a recording medium comprising:
   a housing having an interior space in which food is cooked, and a front panel; and
   means secured to said front panel for receiving and reading a program on a recording medium to control heating of food including a support, a pair of spaced apart rockable holding members mounted for pivotable movement between a first position holding the recording medium for reading and a second position releasing the recording medium for insertion and removal, a recording medium receiving member for receiving said medium when it is inserted between said holding members and said support and falls onto said receiving member and detecting means movable along said medium to read a cooking program from said medium.

2. An apparatus as in claim 1, including drive means mounted on said rockable members for moving said detecting means.

3. A cooking apparatus according to claim 1, wherein said detecting means comprises a switch-holding member supported on said rockable holding means and slidably movable in parallel to said recording medium held by said support means, a plurality of switch members supported on the switch-holding member for reading a cooking program from said recording medium, and a drive mechanism for moving the switch-holding member.

4. A cooking apparatus according to claim 3, wherein said drive mechanism comprises a motor, a pair of first pulleys provided on said rockable members at one end, respectively, a pair of second pulleys provided on said rockable members at the other end, respectively, a shaft to which the first pulleys are secured so as to rotate in synchronism with each other, a pair of timing belts each provided between the first pulley and the second pulley provided on the same rockable member, and a pair of members for securing the ends of said switch-holding member to the timing belts, respectively.

5. A cooking apparatus according to claim 1, wherein said rockable members are positioned within said housing at said first position and partly outside said housing at said second position.

6. A cooking apparatus according to claim 5, wherein said operation means includes an operation member protruding outside said housing, said operation member being operated to rock said rockable members together.

* * * * *